United States Patent
Sibillo

(10) Patent No.: US 9,940,477 B2
(45) Date of Patent: Apr. 10, 2018

(54) GEOLOCATION-BASED ENCRYPTION METHOD AND SYSTEM

(71) Applicant: Agostino Sibillo, Perris, CA (US)

(72) Inventor: Agostino Sibillo, Perris, CA (US)

( * ) Notice: Subject to any disclaimer, the term of this patent is extended or adjusted under 35 U.S.C. 154(b) by 138 days.

(21) Appl. No.: 14/960,034

(22) Filed: Dec. 4, 2015

(65) Prior Publication Data

US 2016/0171238 A1    Jun. 16, 2016

Related U.S. Application Data

(60) Provisional application No. 62/090,492, filed on Dec. 11, 2014.

(51) Int. Cl.
*H04L 29/06*        (2006.01)
*G06F 21/62*        (2013.01)
(Continued)

(52) U.S. Cl.
CPC ........ *G06F 21/6227* (2013.01); *G06F 21/602* (2013.01); *H04L 9/0866* (2013.01);
(Continued)

(58) Field of Classification Search
CPC .. G06F 21/6227; G06F 21/602; H04W 12/02; H04W 4/02
See application file for complete search history.

(56) References Cited

U.S. PATENT DOCUMENTS 5,493,692 A    2/1996 Theimer
5,799,082 A    8/1998 Murphy et al.
(Continued)

FOREIGN PATENT DOCUMENTS

CA    2806485    2/2012
EP    2002440    12/2008

OTHER PUBLICATIONS

Paul Marks, Messaging App Lets You Leave Secrets on Street Corners, Online Magazine, Aug. 4, 2014, New Scientist, United States   http://www.newscientist.com/article/dn25997-messaging-app-lets-youleave-secrets-on-street-corners.html#.VD2Iwfk7s0s.
(Continued)

*Primary Examiner* — Catherine Thiaw
*Assistant Examiner* — Carlton Johnson
(74) *Attorney, Agent, or Firm* — Kevin Schraven; Anooj Patel; Hankin Patent Law, APC

(57) ABSTRACT

A geolocation-based encryption method and system. The geolocation-based encryption method and system may comprise the steps of: providing an encryption application running on a first mobile computing device and a second mobile computing device; generating a key based, at least in part, of a geolocation data, a device identification data, and a unique file identifier associated with said digital content; selecting a target location on the first mobile computing device to create a GPS data, which may be a portion of the geolocation data; encrypting a digital content based on the key; establishing secure session(s) among the user, a recipient, and server(s); and transmitting the encrypted digital content to the server(s). The encrypted digital content may be transmitted from the server(s) to the second mobile computing device. The encryption application may decrypt the encrypted digital content based on the key.

14 Claims, 9 Drawing Sheets

(51) Int. Cl.
*G06F 21/60* (2013.01)
*H04L 9/08* (2006.01)
*H04W 4/02* (2018.01)
*H04W 12/02* (2009.01)

(52) U.S. Cl.
CPC ........ *H04L 9/0872* (2013.01); *H04L 63/0435* (2013.01); *H04W 4/02* (2013.01); *H04W 12/02* (2013.01); *G06F 2221/2111* (2013.01)

(56) References Cited

U.S. PATENT DOCUMENTS

| | | | |
|---|---|---|---|
| 6,353,398 | B1 | 3/2002 | Amin et al. |
| 6,948,062 | B1 | 9/2005 | Clapper |
| 7,203,597 | B2 | 4/2007 | Sato et al. |
| 7,254,581 | B2 | 8/2007 | Johnson et al. |
| 7,257,570 | B2 | 8/2007 | Riise et al. |
| 7,404,084 | B2 | 7/2008 | Fransdonk |
| 8,098,821 | B2 | 1/2012 | Park et al. |
| 8,332,402 | B2 | 12/2012 | Forstall et al. |
| 8,627,061 | B1 | 1/2014 | Best et al. |
| 8,667,266 | B2 | 3/2014 | Adams et al. |
| 8,769,442 | B2 | 7/2014 | Khosravy et al. |
| 8,776,145 | B2 | 7/2014 | Hyde |
| 8,813,107 | B2 | 8/2014 | Higgins et al. |
| 8,817,080 | B2 | 8/2014 | Levine |
| 2003/0108202 | A1 | 6/2003 | Clapper |
| 2006/0095204 | A1* | 5/2006 | Kim .................. G01C 21/3629 701/431 |
| 2007/0220566 | A1 | 9/2007 | Ahmad-Taylor |
| 2008/0109843 | A1 | 5/2008 | Ullah |
| 2010/0214111 | A1 | 8/2010 | Schuler et al. |
| 2012/0113142 | A1* | 5/2012 | Adhikari ............ G06Q 30/0623 345/633 |
| 2013/0042177 | A1* | 2/2013 | Dunko .............. H04M 1/72522 715/716 |
| 2013/0184011 | A1 | 7/2013 | Kaushansky |
| 2014/0059447 | A1 | 2/2014 | Berk |
| 2014/0075493 | A1 | 3/2014 | Krishnan et al. |
| 2014/0082369 | A1* | 3/2014 | Waclawsky ............ G06F 21/62 713/189 |
| 2014/0129824 | A1 | 5/2014 | Paris et al. |

OTHER PUBLICATIONS

Natasha Baker, App for Leaving Your Virtual Mark at Physical Places, Article, Mar. 19, 2012, Reuters, United States http://www.reuters.com/article/2012/03/19/net-us-app-wallitidUSBRE82I04A20120319.

Tasleem Arif, Gesture based sensor encryption, Article, Oct. 30, 2012, IEEE, United States http://ieeexplore.ieee.org/xpl/login.jsp?tp=&arnumber=6409064&url=http%3A%2F%2Fieeexplore.ieee.org%2Fxpls%2Fabs_all.jsp%3 Farnumber%3D6409064.

* cited by examiner

GEOLOCATION-BASED ENCRYPTION METHOD AND SYSTEM

This U.S. Non-Provisional Patent Application claims the benefit of U.S. Provisional Patent Application No. 62/090,496, filed on Dec. 11, 2014, titled "Geolocation-Based Encryption Method and System", by inventor Agostino Sibillo, the contents of which are expressly incorporated herein by this reference as though set forth in their entirety.

FIELD OF USE

The present disclosure relates generally to the field of encryption, and more specifically, to methods and systems for location and geolocation-based encryption schemes for securely distributing and accessing messages and files.

BACKGROUND

Encryption is the process of encoding digital content stored on computer systems, such as messages, data, and/or information in order to protect the confidentiality of the content and to secure such content from unauthorized use. For example, a message may be encrypted into ciphertext using one or more cryptographic techniques. The content may then be read to authorized users only when the content is decrypted. Thus, the primary benefits of encryption is to maintain the data's integrity and limit access to the data to only authorized users.

Despite the various cryptographic techniques available, these techniques do not always provide adequate security. For example, various cryptographic products and software utilize long key lengths. Although longer decryption keys are more powerful, these keys are not a panacea, as the decryption key or password may be compromised through cracking techniques such as the brute force method. Although the brute force method generally requires vast amounts of computing power, and more is needed as the length of the key increase—(e.g., a 32-bit key takes 2^32 (4294967296) steps while a system with 40 bit keys (e.g., US-exportable version of RC4) generally takes 2^40 steps), such computing power is generally available at most universities and small companies.

Another example is the use of identity-based encryption schemes. Identity-based encryption allows a party to create a public key based upon a public, unique identifier such as an e-mail address. When the sender desires to send an encrypted message to a recipient, the sender would only need to know the identifier for sending the message. Once receiving the encrypted message for the first time, the recipient would then request the corresponding private key from a trusted third party (i.e., Private Key Generator (PKG)). The private key is then preferably used to decrypt the message.

Unfortunately, once the third party PKG is compromised, all messages protected over the entire lifetime of the public-private key pair used by that particular server may also be compromised. Thus, the third party PKG generally becomes a prime target to adversaries or to those seeking to break the encryption(s). Although a master private-public key pair may be updated with a new independent key pair, this may create a key-management problem, as most users must have the most recent public key for the server.

Accordingly, there is a need for a new and improved method for encrypting messages and digital data content. Preferably, the new and improved encryption method utilizes geolocation data and internet protocol address data to improve security.

SUMMARY OF EMBODIMENTS

To minimize the limitations in the prior art, and to minimize other limitations that will become apparent upon reading and understanding the present specification, the present specification discloses a new and improved geolocation-based encryption method and system.

One embodiment may be a geolocation-based encryption method, the method comprising: providing an encryption application; wherein the encryption application is configured to run on a first mobile computing device and encrypt a digital content stored in a computer readable storage medium; prompting a user of the first mobile computing device to select a target location on the first mobile computing device to create a global positioning system data; generating a key based on a geolocation data, a device identification data, and a unique file identifier associated with the digital content; wherein the geolocation data may comprise the global positioning system data; encrypting the digital content based on the key; establishing one or more secure sessions between the user and the one or more servers; and transmitting the encrypted digital content to the one or more servers; wherein the encryption application running on the first mobile computing device may be configured to: (1) download the encrypted digital content from the one or more servers based on the device identification data and the unique file identifier; and (2) decrypt the encrypted digital content based on the key to generate a decrypted digital content. The device identification data may comprise an internet protocol address of the first mobile computing device. The encryption application may be configured to run on a second mobile computing device associated with a recipient of the digital content; wherein the device identification data may comprise an internet protocol address of the second mobile computing device; and wherein the encryption application running on the second mobile computing device may be configured to: (1) download the encrypted digital content from the one or more servers based on the device identification data and the unique file identifier; and (2) decrypt the encrypted digital content based on the key to generate the decrypted digital content. The device identification data may comprise a machine access control address of the second mobile computing device. The decryption of the encrypted digital content may occur only when the second mobile computing device is physically positioned approximately at the target location. The decryption of the encrypted digital content may occur on the second mobile computing device only when the recipient selects the targeted location on a digital map displayed on the second mobile computing device. The geolocation-based encryption method may further comprise the step: prompting the user to physically orient the first mobile computing device to a target orientation to create a target gyroscope data; wherein the geolocation data may comprise the target gyroscope data; and wherein the decryption of the encrypted digital content may occur on the second mobile computing device only when the second mobile computing device is physically oriented at approximately the target orientation. The display screen of the second mobile computing device may display an environment with an image overlay of the decrypted digital content via a camera of the second mobile computing device when the second mobile computing device is physically oriented at approximately the target orientation. The image overlay may be one or more advertisements. The image overlay may be a clue for a scavenger hunt, the clue being adapted to direct the user to a second target location.

Another embodiment may be a geolocation-based encryption system, the system comprising: a first mobile computing device having a computer readable storage medium, comprising one or more instructions that, when executed by the first mobile computing device, cause the first mobile computing device to: prompt a user of the first mobile computing device to select a target location on the first mobile computing device to create a global positioning system data; generate a key based on a geolocation data, a device identification data, and a unique file identifier associated with the digital content; wherein the geolocation data may comprise the global positioning system data; encrypt a digital content stored in the computer readable storage medium based on the key; establish one or more secure sessions among the user, a recipient of the digital content, and the one or more servers; and transmit the encrypted digital content to a second mobile computing device associated with the recipient via the one or more servers; wherein the encryption application running on the second mobile computing device may be configured to decrypt the encrypted digital content based on the key to generate a decrypted digital content. The device identification data may comprise an internet protocol address of the second mobile computing device. The decryption of the encrypted digital content may only occur when the second mobile computing device is physically positioned approximately at the target location. The decryption of the encrypted digital content may only occur when the recipient selects the targeted location on a digital map displayed on the second mobile computing device. The geolocation-based encryption method may further comprise: prompting a user to physically orient the first mobile computing device to a target orientation to create a target gyroscope data; wherein the geolocation data may comprise the target gyroscope data; wherein the decryption of the encrypted digital content may occur only when the second mobile computing device is physically oriented at approximately the target orientation.

Another embodiment may be a non-transitory computer readable medium, comprising one or more executable instructions, which, when executed by a first mobile computing device, configure the first mobile computing device to perform a geolocation-based encryption, the method comprising: prompting a user of the first mobile computing device to select a target location on the first mobile computing device to create a global positioning system data; generating a key based on a geolocation data, a device identification data, and a unique file identifier associated with the digital content; wherein the geolocation data may comprise the global positioning system data; encrypting a digital content stored in a computer readable storage medium based on the key; establishing one or more secure sessions among the user, a recipient of the digital content, and the one or more servers; and transmitting the encrypted digital content to the second mobile computing device via the one or more servers; wherein the encryption application running on the second mobile computing device may be configured to decrypt the encrypted digital content based on the key to generate a decrypted digital content. The device identification data may comprise an internet protocol address of the second mobile computing device. The decryption of the encrypted digital content may only occur when the second mobile computing device is physically positioned approximately at the target location. The decryption of the encrypted digital content may only occur when the recipient selects the targeted location on a digital map displayed on the second mobile computing device. The non-transitory computer readable medium may further comprise the step of: prompting a user to physically orient the first mobile computing device to create a target orientation to create a target gyroscope data; wherein the target gyroscope data may be a portion of the geolocation data; and wherein the decryption of the encrypted digital content may occur only when the second mobile computing device is approximately physically oriented at the target orientation.

Another embodiment may be a geolocation-based encryption method, the method comprising: providing an encryption application; wherein the encryption application may be configured to run on a first mobile computing device and a second mobile computing device; generating a key; wherein the key may comprise a geolocation data; prompting a user of the first mobile computing device to select a target location on the first mobile computing device to create a global positioning system data; wherein the global positioning system data may be a portion of the geolocation data; encrypting a digital content stored in a computer readable storage medium by the encryption application running on the first mobile computing device based on the key; establishing one or more secure sessions among the user, a recipient of the digital content, and the one or more servers; and transmitting the encrypted digital content to the second mobile computing device via the one or more servers; wherein the encryption application running on the second mobile computing device may be configured to decrypt the encrypted digital content based on the key to generate a decrypted digital content. The key may further comprise a device identification data of the second mobile computing device. The device identification data may comprise an internet protocol address of the second mobile computing device. The device identification data may comprise a machine access control address of the second mobile computing device. The decryption of the encrypted digital content may occur only when the second mobile computing device is physically positioned approximately at the target location. The decryption of the encrypted digital content may occur on the second mobile computing device only when the recipient selects the targeted location on a digital map displayed on the second mobile computing device. The geolocation-based encryption method may further comprise: prompting the user to physically orient the first mobile computing device to a target orientation to create a target gyroscope data; wherein the target gyroscope data may be a portion of the geolocation data; and wherein the decryption of the encrypted digital content may occur on the second mobile computing device only when the second mobile computing device is physically oriented at approximately the target orientation. The display screen of the second mobile computing device may display an environment with an image overlay of the decrypted digital content via a camera of the second mobile computing device and when the second mobile computing device is physically oriented at approximately the target orientation. The image overlay may be one or more advertisements. The image overlay may be a clue for a scavenger hunt, the clue being adapted to direct the user to a second target location.

Another embodiment may be a geolocation-based encryption system, the system comprising: a first mobile computing device having a computer readable storage medium, comprising one or more instructions that, when executed by the first mobile computing device, cause the first mobile computing device to: generating a key; wherein the key may comprise a geolocation data; prompting a user of the first mobile computing device to select a target location on the first mobile computing device to create a global positioning system data; wherein the global positioning system data may be a portion of the geolocation data; encrypting a digital content stored in the computer readable storage medium based on the key; establishing one or more secure sessions among the user, a recipient of the digital content, and the one or more servers; and transmitting the encrypted digital content to the second mobile computing device via the one or more servers; wherein the encryption application running on the second mobile computing device may be configured to decrypt the encrypted digital content based on the key to generate a decrypted digital content. The key may further comprise a device identification data of the second mobile computing device; wherein the device identification data may comprise an internet protocol address of the second mobile computing device; and wherein the device identification data may comprise a machine access control address of the second mobile computing device. The decryption of the encrypted digital content may only occur when the second mobile computing device is physically positioned approximately at the target location. The decryption of the encrypted digital content may only occur when the recipient selects the targeted location on a digital map displayed on the second mobile computing device. The geolocation-based encryption method may further comprise: prompting a user to physically orient the first mobile computing device to a target orientation to create a target gyroscope data; wherein the target gyroscope data may be a portion of the geolocation data; wherein the decryption of the encrypted digital content may occur only when the second mobile computing device is physically oriented at approximately the target orientation.

Another embodiment may be a non-transitory computer readable medium, comprising one or more executable instructions, which, when executed by a first mobile computing device, configure the first mobile computing device to perform a geolocation-based encryption, the method comprising: generating a key; wherein the key may comprise a geolocation data; prompting a user of the first mobile computing device to select a target location on the first mobile computing device to create a global positioning system data; wherein the global positioning system data may be a portion of the geolocation data; encrypting a digital content stored in a computer readable storage medium based on the key; establishing one or more secure sessions among the user, a recipient of the digital content, and the one or more servers; and transmitting the encrypted digital content to the second mobile computing device via the one or more servers; and wherein the encryption application running on the second mobile computing device may be configured to decrypt the encrypted digital content based on the key to generate a decrypted digital content. The key may further comprise a device identification data of the second mobile computing device; wherein the device identification data may comprise an internet protocol address of the second mobile computing device; and wherein the device identification data may comprise a machine access control address of the second mobile computing device. The decryption of the encrypted digital content may only occur when the second mobile computing device is physically positioned approximately at the target location. The decryption of the encrypted digital content may only occur when the recipient selects the targeted location on a digital map displayed on the second mobile computing device. The non-transitory computer readable medium may further comprise: prompting a user to physically orient the first mobile computing device to create a target orientation to create a target gyroscope data; wherein the target gyroscope data may be a portion of the geolocation data; and wherein the decryption of the encrypted digital content may occur only when the second mobile computing device is approximately physically oriented at the target orientation.

Another embodiment may a geolocation-based encryption method, the method comprising: providing an encryption application; wherein the encryption application may be configured to run on a first mobile computing device and a second mobile computing device; wherein the encryption application may be configured to generate a key based, at least in part, of a geolocation data; prompting a user of the first mobile computing device to select a target location on the first mobile computing device to create a global positioning system data, the global positioning system data being a portion of the geolocation data; encrypting a digital content stored in a computer readable storage medium by the encryption application running on the first mobile computing device based on the key; establishing one or more secure sessions among the user, a recipient of the digital content, and the one or more servers; and transmitting the encrypted digital content to the one or more servers; wherein the encrypted digital content may be transmitted from the one or more servers to the second mobile computing device; and wherein the encryption application running on the second mobile computing device may be configured to decrypt the encrypted digital content based on the key to generate the decrypted digital content. The key may be also based, at least in part, of a device identification data of the second mobile computing device. The device identification data may comprise an internet protocol address of the second mobile computing device. The device identification data may comprise a machine access control address of the second mobile computing device. The decryption of the encrypted digital content on the second mobile computing device may occur when the second mobile computing device is physically positioned at least approximately at the target location based on the global positioning system data, such that the recipient is also physically located at the target location. The decryption of the encrypted digital content may occur on the second mobile computing device when the recipient selects the targeted location on a digital map displayed on the second mobile computing device. The geolocation-based encryption method may further comprise the step of: prompting a user to physically orient the first mobile computing device to create a target gyroscope data, the target gyroscope data being a portion of the geo-location data; wherein the decryption of the encrypted digital content may occur on the second mobile computing device when the second mobile computing device is at least approximately physically oriented based on the target gyroscopic data. The display screen of the second mobile computing device may display an environment with an image overlay of the decrypted digital content when a camera of the second mobile computing device is activated and when the second mobile computing device is at least physically oriented based on the target gyroscope data. The image overlay may be one or more advertisements. The image overlay may be a clue for a scavenger hunt, the clue being adapted to direct the user to a second target location.

Another embodiment may be a geolocation-based encryption system, the system comprising: a first mobile computing device having a computer readable storage medium, comprising one or more instructions that, when executed by the first mobile computing device, cause the first mobile computing device to: generating a key based, at least in part, of a geolocation data; prompting a user of the first mobile computing device to select a target location on the first mobile computing device to create a global positioning system data, the global positioning system data being a portion of the geolocation data; encrypting a digital content stored in a computer readable storage medium based on the key; establishing one or more secure sessions among the user, a recipient of the digital content, and the one or more servers; and transmitting the encrypted digital content to the one or more servers; wherein the encrypted digital content may be transmitted from the one or more servers to the second mobile computing device; and wherein the encryption application running on the second computer may be configured to decrypt the encrypted digital content based on the key to generate the decrypted digital content. The key may be also based, at least in part, of a device identification data of the second mobile computing device; wherein device identification data may comprise an internet protocol address of the second mobile computing device; and wherein the device identification data may comprise a machine access control address of the second mobile computing device. The decryption of the encrypted digital content on the second mobile computing device may occur when the second mobile computing device is physically positioned at least approximately at the target location based on the global positioning system data, such that the recipient is also physically located at the target location. The decryption of the encrypted digital content may occur on the second mobile computing device when the recipient selects the targeted location on a digital map displayed on the second mobile computing device. The geolocation-based encryption method may further comprise the step of: prompting a user to physically orient the first mobile computing device to create a target gyroscope data, the target gyroscope data being a portion of the geo-location data; wherein the decryption of the encrypted digital content may occur on the second mobile computing device when the second mobile computing device is at least approximately physically oriented based on the target gyroscopic data.

Another embodiment may be a non-transitory computer readable medium, comprising one or more executable instructions, which, when executed by a first mobile computing device, configure the first mobile computing device to perform a geolocation-based encryption method, comprising: generating a key based, at least in part, of a geolocation data; prompting a user of the first mobile computing device to select a target location on the first mobile computing device to create a global positioning system data, the global positioning system data being a portion of the geolocation data; encrypting a digital content stored in a computer readable storage medium based on the key; establishing one or more secure sessions among the user, a recipient of the digital content, and the one or more servers; and transmitting the encrypted digital content to the one or more servers; wherein the encrypted digital content may be transmitted from the one or more servers to the second mobile computing device; and wherein the encryption application running on the second computer may be configured to decrypt the encrypted digital content based on the key to generate the decrypted digital content. The key may also be based, at least in part, of a device identification data of the second mobile computing device; wherein device identification data may comprise an internet protocol address of the second mobile computing device; and wherein the device identification data may comprise a machine access control address of the second mobile computing device. The decryption of the encrypted digital content on the second mobile computing device may occur when the second mobile computing device is physically positioned at least approximately at the target location based on the global positioning system data, such that the recipient is also physically located at the target location. The decryption of the encrypted digital content may occur on the second mobile computing device when the recipient selects the targeted location on a digital map displayed on the second mobile computing device. The geolocation-based encryption method may further comprise the step of: prompting a user to physically orient the first mobile computing device to create a target gyroscope data, the target gyroscope data being a portion of the geo-location data; wherein the decryption of the encrypted digital content may occurs on the second mobile computing device when the second mobile computing device is at least approximately physically oriented based on the target gyroscopic data.

It is an object to provide a method that encrypts digital content stored on a user's device. Preferably, the encryption method utilizes a key based on various geolocation data such as global positioning system (GPS) data generated by the mobile computing device and gyroscope data. The key of the encryption method may also utilize a device identification data such as an internet protocol (IP) address and machine access control (MAC) address of the mobile computing device to encrypt and decrypt the digital content. The key of the encryption method may also utilize a unique file identifier associated with the digital content to be encrypted.

It is an object to provide a method that enables communication privacy between various individuals. Preferably, the method enables a user to publish a public comment regarding any location in the world and on the nature, activity, substance and condition of that location by "dropping" messages tied to that location.

It is an object to provide a method that encrypts digital content stored on a user's device with a key utilizing: (1) geolocation data (e.g., GPS coordinates data, gyroscope data) and (2) device identification data (e.g., IP address data, MAC address data). The geolocation data may be provided by the user via the following steps: (i) loading a digital map using the encryption application running on the mobile computing device of the user; (ii) selecting a target location on the digital map (e.g., dropping a pin of the target location on the digital map) to obtain GPS coordinates; and (iii) using the GPS coordinates as the geolocation data for the key.

In order for the recipient to decrypt the digital content, the recipient may decrypt such content via multiple approaches. In one embodiment, the recipient may decrypt the encrypted content by performing the following steps: (i) visiting the target location selected by the user, such that the GPS coordinates generated by the recipient's mobile computing device fulfill the geolocation data portion of the key; (ii) activating the camera function on the mobile computing device; and (iii) viewing the decrypted digital content on the display screen of the mobile computing device. The IP address and MAC address of the recipient's mobile computing device may be used to satisfy the device identification data portion of the key. Additionally, the gyroscope data generated by the mobile computing device may be used to orient the device at a particular angle for viewing the decrypted message. Thus, in this embodiment, the recipient preferably decrypts the encrypted digital content by physically visiting the target location selected by the user.

In another embodiment, the recipient may decrypt the encrypted content by performing the following steps: (i) loading a digital map using the encryption application running on the recipient's mobile computing device; (ii) inputting or selecting the target location selected by the user previously (e.g., dropping a pin of the target location on the digital map); and (iii) based on the target location inputted by the recipient, using the GPS coordinates of that target location to satisfy the geolocation data portion of the key. The IP address and MAC address of the recipient's mobile computing device may be used to satisfy the device identification data portion of the key. Thus, in this embodiment, the recipient may decrypt the encrypted digital content simply by selecting the target location on a digital map without having to physically visit the target location.

In another embodiment, the geolocation-based encryption method may be used to create a scavenger hunt. In one embodiment, the scavenger hunt may allow a user to create a series of clues which are accessible by a scavenger hunt participant once one or more of the decryption key parameters are met or substantially met. The clue may be displayed as an overlay, as described above, or by another way of communicating information to the scavenger hunt participant. The clue may provide the scavenger hunt participant with a hint as to how to meet one or more of the decryption key parameters of the next clue in order to view the next clue. The scavenger hunt may have a series of clues, with each clue directing the scavenger hunt participant to find a next clue until the scavenger hunt has been completed.

In another embodiment, the scavenger hunt may allow the recipient to decrypt messages that direct one or more recipients to visit additional target locations in order to obtain additional clues for the scavenger hunt. Specifically, when a recipient decrypts the encrypted content by physically visiting the target location, the decrypted digital content may include additional clues for the next target location.

In another embodiment, the method may include advertisements. Specifically, in this embodiment, when the recipient decrypts the encrypted content, the decrypted digital content may comprise advertisements that promote the goods or services for a company.

In various embodiments, the server may store the following: (1) the encrypted digital content, (2) unique file identifier associated with that digital content; and (3) IP address or mobile computing device of the user or intended recipient. The user or recipient may then download or retrieve that encrypted digital content if the IP address of the user's or recipient's mobile device is verified by the encryption application running on that mobile device. This may be achieved by cross checking the IP address of the user's or recipient's mobile device and the IP address stored in the server. Once verified, the user or recipient may download or retrieve the encrypted digital content.

In another embodiment, after the encrypted digital content is downloaded to the user's or recipient's mobile computing device, the user's or recipient's mobile computing device may also store the following: (1) unique file identifier associated with that digital content and (2) geolocation data. The user or recipient may then proceed in having the encryption application decrypt the encrypted digital content. In doing so, the encryption application may verify the geolocation data stored in the mobile computing device by checking the (1) unique file identifier associated with that digital content and/or (2) geolocation data. Once verified, the encryption application may proceed with the decryption of the encrypted digital content.

It is an object to provide a computer-based method that allows users to view decrypted digital content via a camera and a display screen of the mobile computing device.

It is an object to provide a new method for promoting advertisements via geolocation-based encryption. Preferably, users utilizing the cameras on their mobile phones may be able to decrypt and view messages that have been created for the general public to view. Preferably, these public messages are viewable only at the locations where they were originally created.

It is an object to overcome the deficiencies of the prior art.

These, as well as other components, steps, features, objects, benefits, and advantages, will now become clear from a review of the following detailed description of illustrative embodiments, of the accompanying photographs, and of the claims.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF ILLUSTRATIVE EMBODIMENTS

Figure 1:
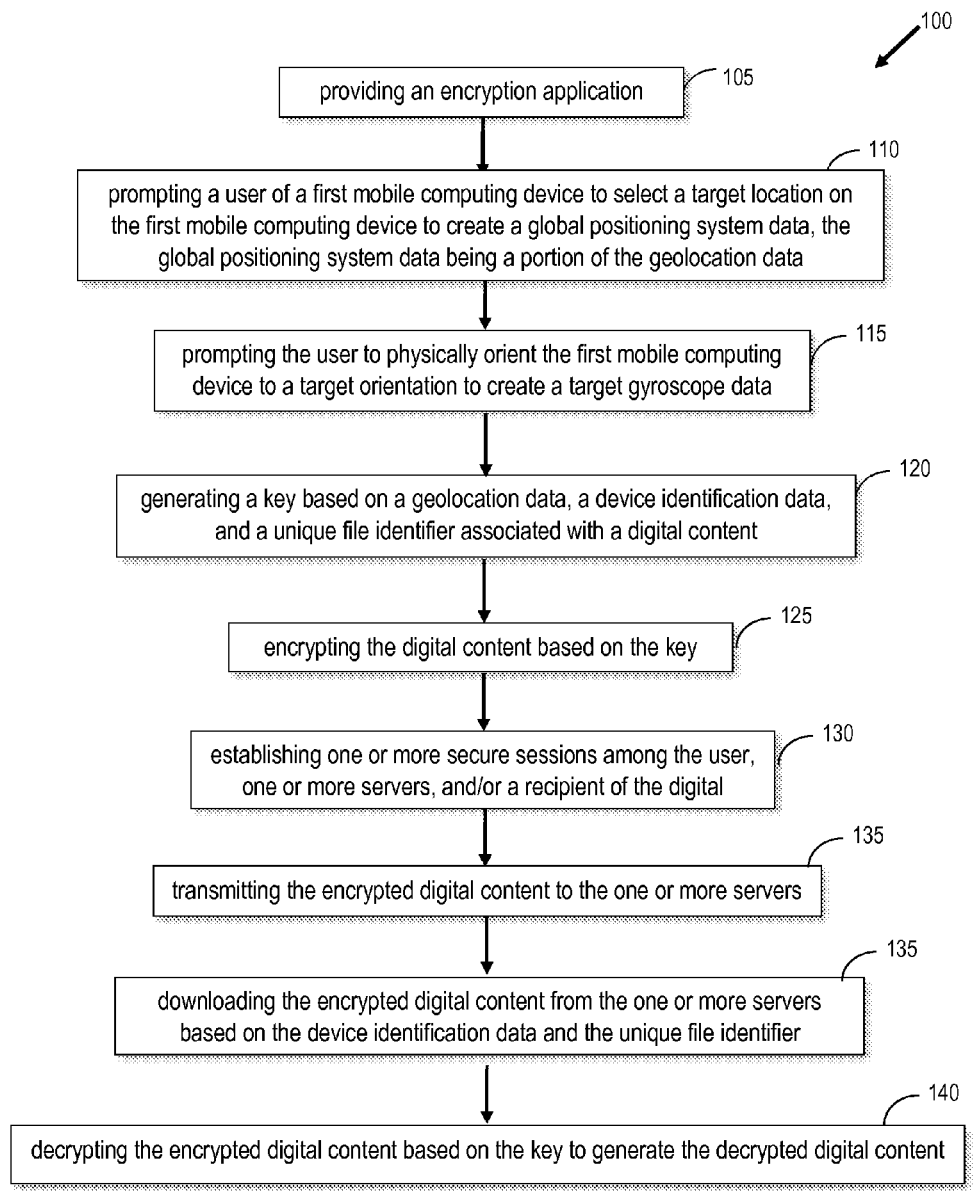
FIG. 1 is an illustration of one embodiment of a geolocation-based encryption method.

In the following detailed description of various embodiments, numerous specific details are set forth in order to provide a thorough understanding of various aspects of one or more embodiments. However, one or more embodiments may be practiced without some or all of these specific details. In other instances, well-known procedures and/or components have not been described in detail so as not to unnecessarily obscure aspects of the embodiments.

While some embodiments are disclosed here, still other embodiments will become obvious to those skilled in the art as a result of the following detailed description of the illustrative embodiments. The embodiments are capable of modifications of various obvious aspects, all without departing from the spirit and scope of the protection. The figures, and their detailed descriptions, are to be regarded as illustrative in nature and not restrictive. Also, the reference or non-reference to a particular embodiment shall not be interpreted to limit the scope of protection.

Definitions

In the following description, certain terminology is used to describe certain features of one or more embodiments. For instance, the terms "computer", "computer system", and "mobile computing device" generally refer to any apparatus or device that processes information with an integrated circuit chip, including without limitation, mainframe computers, workstations, gaming consoles, servers, desktop computers, portable computers, laptop computers, and embedded computers. Furthermore, the term "mobile computing device" may refer to any wireless electronic devices including smart phones, cellular phones, tablet computers, personal digital assistants, digital media players, portable game players, and hand-held computers.

As used herein, the terms "Internet" or "Cloud" generally refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof.

As used herein, the terms "application", "software", "encryption application", or "software application" generally refer to any set of machine-readable instructions on a client machine, web interface, mobile computing device, and/or mobile computing device, that directs a processor to perform specific steps, processes, or operations disclosed herein.

As used herein, the term "geolocation" generally refers the process or technique of identifying the geographical location of a person or device by means of digital information processed via the Internet. Thus, geolocation-based encryption may refer to technology that utilizes a user's location when using the Internet or a mobile phone. The term "geolocation data" may refer to data that is utilized for locating a user, including without limitation, network router list data, global positioning satellite data, internet protocol address data, gyroscope data, and an accelerometer data. The term "network router list data" may refer to any data or information pertaining to the existing routers at an actual, physical location of a user.

The present specification discloses a geolocation-based encryption method and system. The method and system may be used to encrypt and decrypt digital content based on a location selected by a user. Specifically, a user may encrypt a message and its attachments using a software algorithm that creates a key based on, inter alia, geolocation data (e.g., global positioning satellite (GPS) data, gyroscope data) and/or device identification data (e.g., internet protocol (IP) address data, machine access control (MAC) address data) of the mobile computing device of the user(s) or recipient(s). The recipient may then decrypt the message and attachments based on the key using the same type of data—e.g., GPS, gyroscope, and IP address—of the recipient's mobile computing device.

In particular, when encrypting a message, the GPS capabilities and gyroscope data of the mobile computing device may be used by the encryption software to create a key. Optionally, data pertaining to a list of networking hardware (e.g., network routers) near (or at least within range of) the user and mobile computing device (i.e., network router list data) may also be sent to the encryption software as part of the key. For example, in one embodiment, the list of networking hardware may be acquired by the mobile computing device by scanning and receiving of wireless signals of the networking hardware located near the mobile computing device of the user. After the digital content is encrypted, the digital content may be sent and stored on a server and may be accessible by the recipient only when the recipient inputs the proper target location or is at the target location. Preferably, the message is addressed to a specific device owned by the recipient via a unique identification number (e.g., IP address/MAC address of the mobile computing device). That way, the message may only be decrypted by that specific mobile computing device.

In order for the recipient to decrypt the digital content, the recipient may decrypt such content in various approaches. In one embodiment, the recipient may decrypt the encrypted content by performing the following steps: (i) visiting the target location selected by the user, such that the GPS coordinates generated by the recipient's mobile computing device fulfill the geolocation data portion of the key; (ii) activating the camera function on the mobile computing device; and (iii) viewing the decrypted digital content on the display screen of the mobile computing device. The IP address and MAC address of the recipient's mobile computing device may be used to satisfy the device identification data portion of the key. Additionally, the gyroscope data generated by the mobile computing device may be used to orient the device at a particular angle for viewing the decrypted message. Thus, in this embodiment, the recipient preferably decrypts the encrypted digital content by physically visiting the target location selected by the user and perhaps orienting the device at a particular angle.

In another embodiment, the recipient may decrypt the encrypted content by performing the following steps: (i) loading a digital map using the encryption application running on the recipient's mobile computing device; (ii) inputting or selecting the target location selected by the user previously (e.g., dropping a pin of the target location on the digital map); and (iii) based on the target location inputted by the recipient, using the GPS coordinates of that target location to satisfy the geolocation data portion of the key. The IP address and MAC address of the recipient's mobile computing device may be used to satisfy the device identification data portion of the key. Thus, in this embodiment, the recipient may decrypt the encrypted digital content simply by selecting the target location on a digital map without having to physically visit the target location.

In another embodiment, the key may comprise network router list data, IP address, GPS coordinates, and gyroscope data, which may then be used to decrypt the message. For instance, by positioning the camera and display of the mobile computing device at the target location and by compiling a list (complete or partial) of networking hardware nearby the mobile electronic device, the user may then decrypt the message and access and view the encrypted and previously hidden message.

In the event that the recipient is located somewhat near the desired location, but not at the precise targeted area, the software may direct the intended recipient to the exact location to enable the recipient to decrypt the message.

In various embodiments, the geolocation-based encryption method and system may also utilize generic public message by using digital advertising space, which would be visible when users use their electronic device to search for the exact physical location of the message. For example, the public message may be in the form of advertisements. The advertisement may appear to the user via the camera of the mobile computing device.

FIG. 1 is an illustration of one embodiment of a geolocation-based encryption method. As shown in FIG. 1, one embodiment of the geolocation-based encryption method 100 may comprise steps 105, 110, 115, 118, 120, 125, 130, 135, 140. Specifically, FIG. 1 shows that the method 100 may comprise the first step 105 of providing an encryption application. The encryption application is generally an application or software program that runs on a computer system or mobile computing device and may be configured to encode or encrypt digital content such as a message, image, or video so that the encrypted digital content can be read only by the user/sender and/or intended recipient(s). Importantly, the encryption application may also be configured to encrypt such digital content based on, inter alia, geolocation data. For example, in one embodiment, the encryption application may encrypt digital content based on a key utilizing geolocation data such as GPS data (e.g., GPS coordinates). In another embodiment, the encryption application may also encrypt digital content based on a key utilizing gyroscope data. In various embodiments, the encryption application may also encrypt digital content utilizing other data such device identification data, which may include IP address data and/or MAC address data, and perhaps a unique file identifier associated with the digital content to be encrypted. This will preferably allow only the sender or the intended recipient to receive, decrypt, and/or view the digital content. In various embodiments, the encryption application may also be configured to decode or decrypt the encrypted digital content.

FIG. 1 also shows the next step 110, which may be prompting the user of a first mobile computing device to select a target location. This may allow the encryption application to also create global positioning system data, which may be at least part of the geolocation data necessary for a key. The global positioning system data may, for example, be latitudinal and longitudinal coordinates of a specific location on a map, and, in some embodiments, the latitudinal and longitudinal coordinates may be converted to a numeric or alphanumeric value used for the encryption key.

In one embodiment, the user may select a target location by simply touching or pinning a target location shown on that digital map. Specifically, the user may first launch a digital map on his or her mobile computing device via the encryption application and touch or "pin" the exact target location on that digital map. In another embodiment, the user may select a target location by simply inputting the GPS coordinates into the encryption application. In this manner, the user may type the desired GPS coordinates into the encryption application in order to select the target location. In various embodiments, the user may need to be physically present at the target location in order to select a target location.

In addition to geolocation data, the encryption application may also utilize the IP address and/or MAC address of the mobile computing device of the user or recipient to further strengthen the encryption of the digital content. The encryption application may also use a unique file identifier associated with the digital content as part of the key to also further strengthen the encryption of the digital content. The unique file identifier may be a unique alphanumeric or numeric value assigned to that particular digital content.

FIG. 1 also shows that, in other embodiments, the geolocation-based encryption method 100 may also comprise step 115, which may be prompting the user to physically orient the first mobile computing device to a target orientation to create a target gyroscope data. This step may be attributed to certain embodiments of the geolocation-based encryption method 100. As discussed above, the geolocation data may also comprise gyroscope data, which may require that the recipient orient his or her mobile computing device at a particular angle (i.e., target orientation) in order to unlock or decrypt the encrypted digital data. For example, the user may first create a key with gyroscope data, requiring that the recipient orient his or her mobile computing device facing northwest at approximately a 40 degree angle. Thus, in this manner, in addition to being physically at the target location, the recipient may view the hidden or encrypted message only when the recipient orients his or her mobile computing device at that particular angle.

Once the geolocation data is inputted by the user or entered into the encryption application, the encryption application may also prompt the user or retrieve other data for the encryption key. Such data may include device identification data (e.g., internet protocol address of the user or recipient of the digital content) and the unique file identifier associated with the digital content. Various embodiments of the encryption application may utilize a single form of data (e.g., geolocation data only) or possibly the geolocation data, device identification data, and unique file identifier data.

Once the data or information is obtained by the encryption application, the geolocation-based encryption method may perform the next step 120, which may be generating a key. As discussed above, in one embodiment, the key may be generated based on a geolocation data, a device identification data, and a unique file identifier associated with the digital content. Preferably, the encryption application preferably encodes digital content based on an encryption key. In one embodiment, the key may comprise portions that pertain to geolocation data such as GPS coordinates (e.g., latitude/longitude coordinates) and/or gyroscope coordinates. For example, the key may include GPS data of the target location of the intended recipient(s). The GPS data of the target location may be a particular location only known to the sender and recipient such as the user's or recipient's residence, business address, or special location known only between the user and recipient. In another embodiment, the geolocation data may also comprise gyroscope data that only unlock the encrypted digital data when the mobile computing device is oriented at a particular angle (i.e., target orientation) for viewing the decrypted message. For example, the user, using the encryption software, may create a key requiring geolocation data for the orienting the recipient's mobile computing device facing north at approximately a 45 degree angle. In this manner, the hidden or encrypted message may unlock and be viewable in the recipient's mobile computing device only when the recipient's mobile computing device is likewise positioned at that angle.

Additionally, the key may comprise device identification data such as the IP address of recipient and a unique file identifier, which may a specific value assigned to the digital content to be encrypted. For example, in one embodiment, the key may comprise the geolocation data and a unique file identifier. In another embodiment, the key may comprise the geolocation data, a unique file identifier, and an IP address of the recipient.

Once the key has been created, the encryption application may perform step 125, which may be encrypting the digital content stored in a computer readable storage medium based on the key. As discussed above, the digital content may be encrypted by the encryption application and may include, without limitation, a message, image, advertisement, direction, file, or any other piece of digital information. In one embodiment, the digital content may be created by the user or may be uploaded to a computer readable medium of the mobile computing device. In an alternative embodiment, the user may also download the digital content from the Internet or networked computers. The user may also, in another embodiment, create the digital content via a message and "drop" that message to a particular location on a map, such that the message is tied to that location. Preferably, the digital content to be encrypted is stored in a computer readable storage medium of the device running the encryption application.

The digital content may then be encrypted via one or more encryption algorithms that utilize various parameters including location, orientation, device identification, and/or a unique file identifier. The location parameter may be based on GPS coordinate data such as the latitude and longitude generated by the mobile computing device. Alternatively, the GPS coordinate data may simply be inputted by the user. In one embodiment, the location may be provided by inputting geographic locations, such as selecting a target location on a digital map displayed on the mobile computing device.

Regarding the orientation parameter, a gyroscope component of the mobile computing device may be used to provide the gyroscope data for orienting the device at a certain approximate angle. The gyroscope data may be inputted by the user or may be recorded by the encryption application when the mobile computing device is positioned at a certain angle.

Regarding the device identification parameter, this parameter may comprise the IP address or MAC address of the mobile computing device and may be inputted by the user. In one embodiment, the user may select the recipient of the digital content, and in doing so, the encryption application may retrieve the recipient's IP address of his or her device. In another embodiment, the user may select the recipient of the digital content, and the encryption application may retrieve both the recipient's IP address and MAC address. The encryption application may then use the IP address and/or MAC address as part of the key.

After the digital content is encrypted in step 125, the encryption application may perform step 130, which may be establishing one or more secure sessions among the user, a recipient of the digital content, and/or the one or more servers. Here, various security protocols may be used to establish a secure session to allow the transmission of sensitive data across the different communication networks. This will preferably allow the encrypted digital data to remain secure and un-tampered from unauthorized recipients. In one embodiment, the user's mobile computing device may require a negotiation or handshaking phase that requires the server to verify that the intended sender is the authorized user. For example, the user or client may exchange a handshake with a server to establish a secure session. In response, the server may transmit various security operations, which may a primitive security operation or a macro security operation. The mobile computing device of the user, for instance, may initially transmit various messages or utilize a random number generator to generate and store a random number(s) in response to s random number operation. In another embodiment, random numbers may be generated in advance of establishing the session, which may generate a hash of the accumulated handshake messages. The server may then transmit a message or certificate for authorized access. In another embodiment, the encryption application and server may not utilize security questions, random number generators, messages, or certificates.

Once the secured sessions are established, the encrypted digital content may be transmitted to the second mobile computing device via one or more servers, as shown in step 135. In one embodiment, the encrypted digital content may first be transmitted to a server or database for storage and then retransmitted to the recipient's second mobile computing device for decrypting. Specifically, the recipient may download or access the encrypted digital content, and the encrypted digital content may first be verified by cross-checking the IP address and/or MAC address of the mobile computing device of the intended recipient. This may be accomplished by having the IP address or MAC address verified by checking the key created by the encryption application. Thus, once the encrypted digital content is downloaded to the second mobile computing device, the user may then decrypt the digital content using the encryption application.

In another embodiment, the encrypted digital content may first be transmitted to a storage medium in a server and then decrypted before being transmitted to the second mobile computing device. Specifically, the recipient may first access and decrypt the encrypted digital content while that encrypted digital content is stored in the server. Once decrypted, the recipient may then download or access the decrypted digital content using the second mobile computing device, and the decrypted digital content may be verified by cross-checking the IP address and/or MAC address of the mobile computing device of the intended recipient. Both the IP address and MAC address may be verified by checking the key created by the encryption application. Preferably, the encrypted digital content is stored in the database or server, so that the intended recipient may access such digital content via the Internet or network.

Still, in an alternative embodiment, the encrypted digital content may be stored in the user's first mobile computing device and not be transmitted to a server for storage. Here, in this embodiment, the digital content may be encrypted using only the geolocation data and the unique file identifier associated with that digital content without the device identification data (e.g., IP address). Thus, when the decrypting the encrypted digital content, the encryption application may check the unique file identifier, and the user may then decrypt the digital content by simply inputting the correct geolocation data or GPS coordinates into the encryption application.

FIG. 1 also shows that the geolocation-based encryption method 100 may also comprise step 135, which may be downloading the encrypted digital content from the server(s). This downloading may be based on various data stored along with the encrypted digital content such as device identification data (e.g., IP address) and/or the unique file identifier that is associated with the encrypted digital content. Here, in one embodiment, the encrypted digital content may be stored in a server along with other forms of data such as the unique file identifier data and the IP address of the recipient's mobile computing device. The recipient or user requesting to download the digital content may make a request to the server via the encryption application. Before downloading the encrypted digital content from the server(s), the encryption application may first verify the device identification data of the recipient (e.g., IP address) and/or the unique file identifier. Once verified, the encrypted digital content may be downloaded to the recipient's device.

FIG. 1 also shows step 140 of the geolocation method 100, which may be decrypting the encrypted digital content based on the key to create the decrypted digital content. In various embodiments, the decryption of the encrypted digital content may utilize various parameters similar to the encryption algorithm parameters. For example, in one embodiment, in order to decrypt the digital content, the recipient may be required to have the same location, orientation, and identification parameters as utilized by the encryption algorithm. For example, in one embodiment, the intended recipient may utilize the encryption application to access the digital content. In doing so, the user may encrypt the digital content with a key comprising a geolocation data, which may include the target location selected by the user (and known only between the user and intended recipient). The intended recipient may then decrypt the encrypted digital data by simply selecting the target location. In this manner, the recipient may access the digital content without having to physically be at the target location. For example, the recipient may decrypt the encrypted content by performing the following steps: (i) loading a digital map using the encryption application running on the recipient's mobile computing device; (ii) inputting or selecting the target location selected by the user previously (e.g., dropping a pin of the target location on the digital map); and (iii) based on the target location inputted by the recipient, using the GPS coordinates of that target location to satisfy the geolocation data portion of the key. The IP address and/or MAC address of the recipient's mobile computing device may also be used to satisfy the device identification data portion of the key. The unique file identifier may also be used to satisfy a portion of the key. Thus, in this embodiment, the recipient may decrypt the encrypted digital content simply by selecting the target location on a digital map without having to physically visit the target location.

In another embodiment, step 135 may be performed by requiring the intended recipient to be physically located at the targeted location. Specifically, in this embodiment, the user may encrypt the digital content by selecting a target location known only known between the user and intended recipient. The intended recipient may then decrypt the encrypted digital data by visiting the target location with his or her mobile computing device. In this manner, the digital content such as a message may be securely accessed by intended recipient only if the recipient is at the target location. For example, the recipient may decrypt the encrypted content by performing the following steps: (i) visiting the target location selected by the user, such that the GPS coordinates generated by the recipient's mobile computing device fulfill the geolocation data portion of the key; (ii) activating the camera function on the mobile computing device; and (iii) viewing the decrypted digital content tied to that location on the display screen of the mobile computing device. The IP address and MAC address of the recipient's mobile computing device may be used to satisfy the device identification data portion of the key. Additionally, the gyroscope data generated by the mobile computing device may be used to orient the device at a particular angle for viewing the decrypted message. The unique file identifier may also be used to satisfy a portion of the key. Thus, in this embodiment, the recipient preferably decrypts the encrypted digital content by physically visiting the target location selected by the user.

In various embodiments, one or more image overlays may be generated when the recipient visits the targeted location. These image overlays may vary based on how closely the key parameters match the parameters used by the encryption algorithm. For example, if the actual location of the recipient's mobile computing device and the parameters set by the encryption algorithm have a difference of several feet, the overlay may signal recipient where to move in order for the location of the mobile computing device to match the parameters of the encryption algorithm. In other embodiments, the image overlay may also comprise messages, advertisements, information, data, directions, or anything else that may be displayed on the display.

In various embodiments, the mobile computing device of the user or recipient may also store the following: (1) unique file identifier associated with that digital content and (2) geolocation data. The user or recipient may then proceed in having the encryption application decrypt the encrypted digital content. In doing so, the encryption application may verify the geolocation data stored in the mobile computing device by checking the (1) unique file identifier associated with that digital content and/or (2) geolocation data. Once verified, the encryption application may proceed with the decryption of the encrypted digital content.

Figure 2:
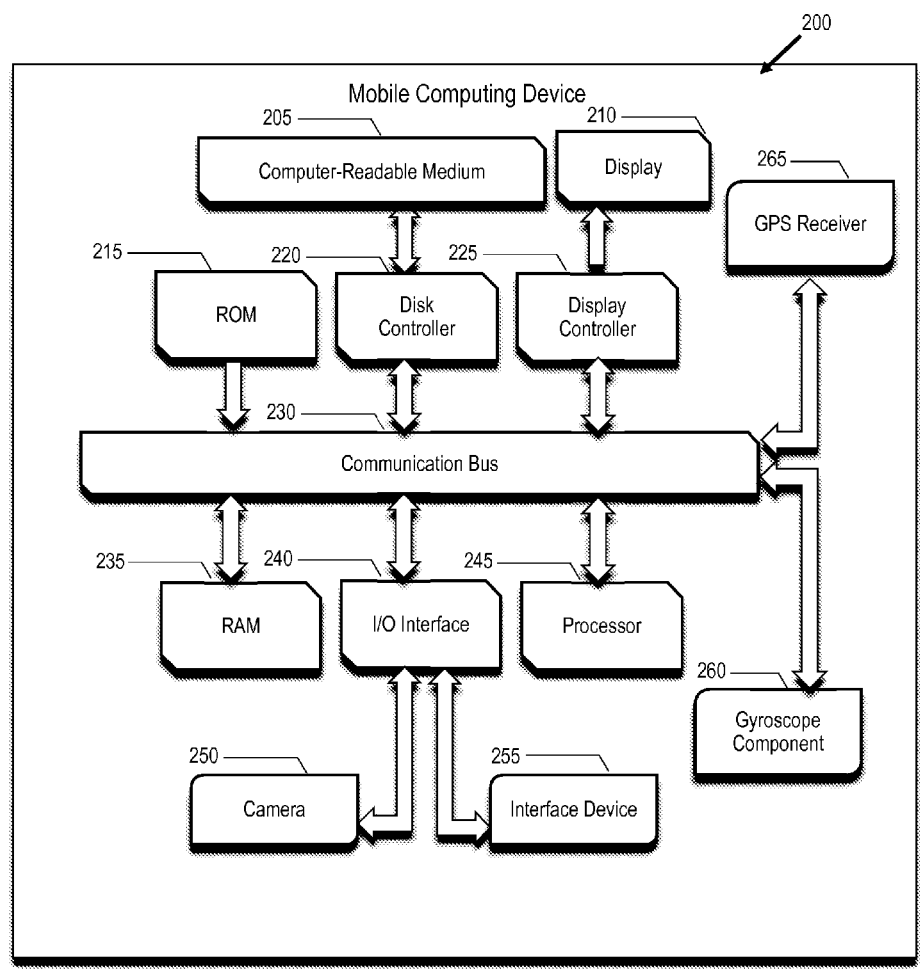
FIG. 2 is a block diagram of one embodiment of a mobile computing device.

FIG. 2 is a block diagram of one embodiment of a mobile computing device. As shown in FIG. 2, one embodiment of the mobile computing device 200 may comprise: a computer-readable medium 205, display 210, read only memory (ROM) 215, disk controller 220, display controller 225, communication bus 230, random access memory (RAM) 235, input/output (I/O) interface 240, processor 245, camera 250, one or more interface devices 255, gyroscope component 260, and GPS receiver 265. The interface devices may be: a keyboard, pointing device (e.g., mouse), and/or a touchscreen used to allow the user or recipient to provide inputs into the mobile computing device 200. The processor 245 is generally any component, or logic circuitry that responds to and processes the basic instructions that drive the mobile computing device 200. The processor 245 may be electronically coupled to a communication bus 230, and the communication bus 230 may be electronically coupled to other electronic hardware or components, including without limitation, a display controller 225, RAM 235, ROM 215, disk controller 220, and I/O interface 240. The disk controller 225 may be configured to control the computer-readable medium 205, which may be a hard drive and/or optical disk drive. The computer-readable medium 205 may also be another form of random access memory or flash memory. The display controller 225 may be coupled to a display 210 such as a liquid crystal display (LCD), projection system, or touchscreen. The I/O interface 240 may be coupled to one or more input devices such as an interface device 255 (e.g., mouse, keyboard, pointing device, touchscreen) or camera 250. The camera 250 may be any component or electronic device capable of viewing an environment and/or capturing one or more images and/or videos onto an electronic memory component. In additional embodiments, the mobile computing device 200 may also comprise a network controller card that may connect to a network, such as the Internet or along an Intranet. In various embodiments, the mobile computing device 200 may include mobile computing devices, including without limitation, laptops, smartphones, tablets, and wearables.

The processor 245 may be configured to execute a set of computer readable instructions and further to execute a software program, application or computer implemented instructions described herein such as the customer feedback application. The computer readable instructions and application may comprise instructions that cause the processor 245 to perform one or more processes when the instructions are executed by the processor 245. In other various embodiments, the computer readable instructions or application may be tangibly embodied in the memory of the mobile computing device 200 such as the RAM 235 or ROM 215, as shown in FIG. 2, or on a computer-readable storage medium, such as a magnetic, optical or solid-state digital storage medium.

The GPS receiver 260 preferably collects GPS signals and data from GPS satellites. The gyroscope component 265 preferably gathers orientation data of the mobile computing device. Although FIG. 2 shows that the computing device 200 comprises thirteen components, it should be understood that the computing device may comprise any number of components.

Figure 3:
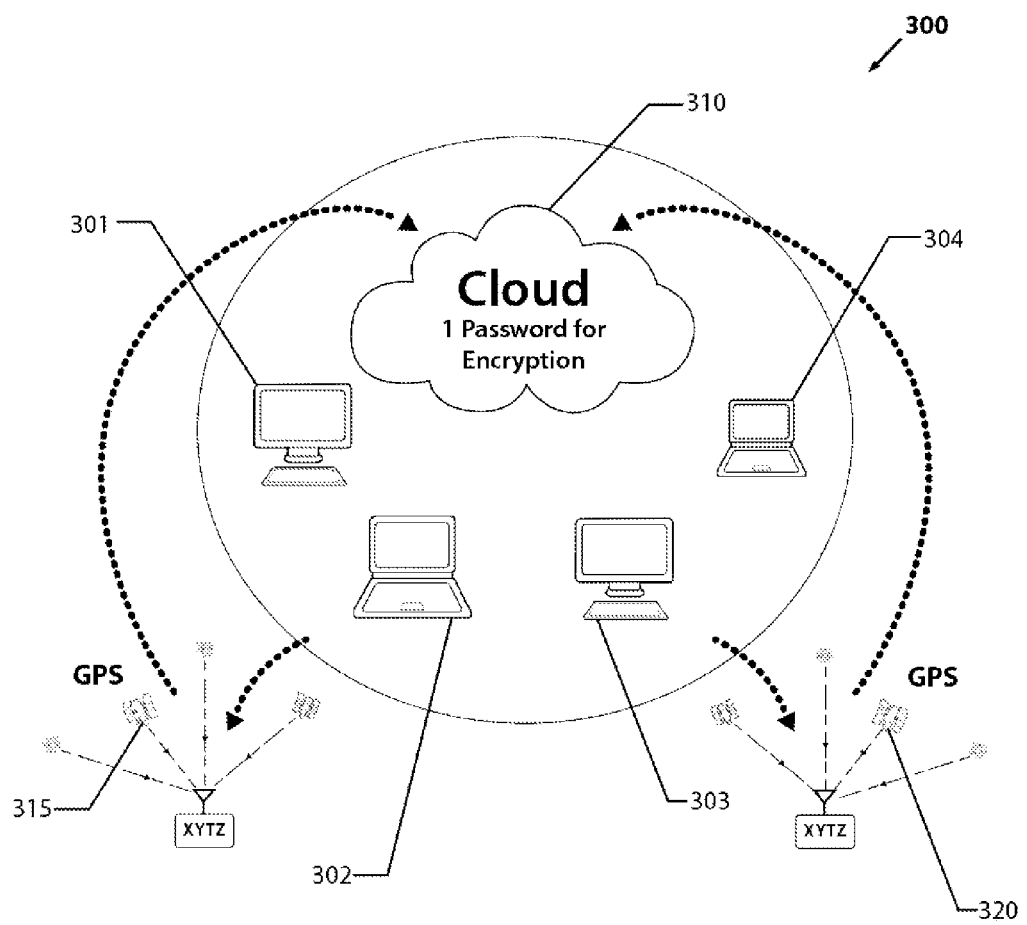
FIG. 3 is an illustration of one embodiment of the geolocation-based encryption system.

FIG. 3 is an illustration of one embodiment of the geolocation-based encryption system. As shown in FIG. 3, one embodiment of the geolocation-based encryption system 300 may comprise: one or more mobile computing devices, 301, 302, 303, 304, and one or more servers, which are preferably part of the Cloud or Internet 310. Here, one embodiment of the geolocation-based encryption system 300 may utilize GPS satellites for generating the GPS signals for the geolocation data portion of the key disclosed herein. The key may be based on latitude, longitude, and altitude generated by GPS satellites 315, 320, but may also comprise other parameters such as gyroscope orientation of the mobile computing device, as determined by a gyroscope component. Furthermore, the key may also require specific information, which may be unique, inherent, or generated by the mobile computing device, such as an IP address or MAC address.

Figure 4:
FIG. 4 is a screenshot of one embodiment of the encryption application and shows how a user may select a target location on the encryption application.

FIG. 4 is a screenshot of one embodiment of the encryption application and shows how a user may select a target location on the encryption application. As shown in FIG. 4, one embodiment of the encryption application 400 may comprise: a pin 405 and a digital map 410. As discussed above, a user may select a target location on the encryption application 400 by first loading a digital map 410, and selecting the target location 415. The target location 415 may be selected by inputting a pin 405 on the digital map 410 of the user's mobile computing device. This may allow the user to create the geolocation data portion of the key and may allow the user to drop a digital content (e.g., message) at a particular location. Similarly, in other embodiments, the recipient may select the target location by simply inputting a pin on a digital map on the recipient's mobile computing device.

Figure 5:
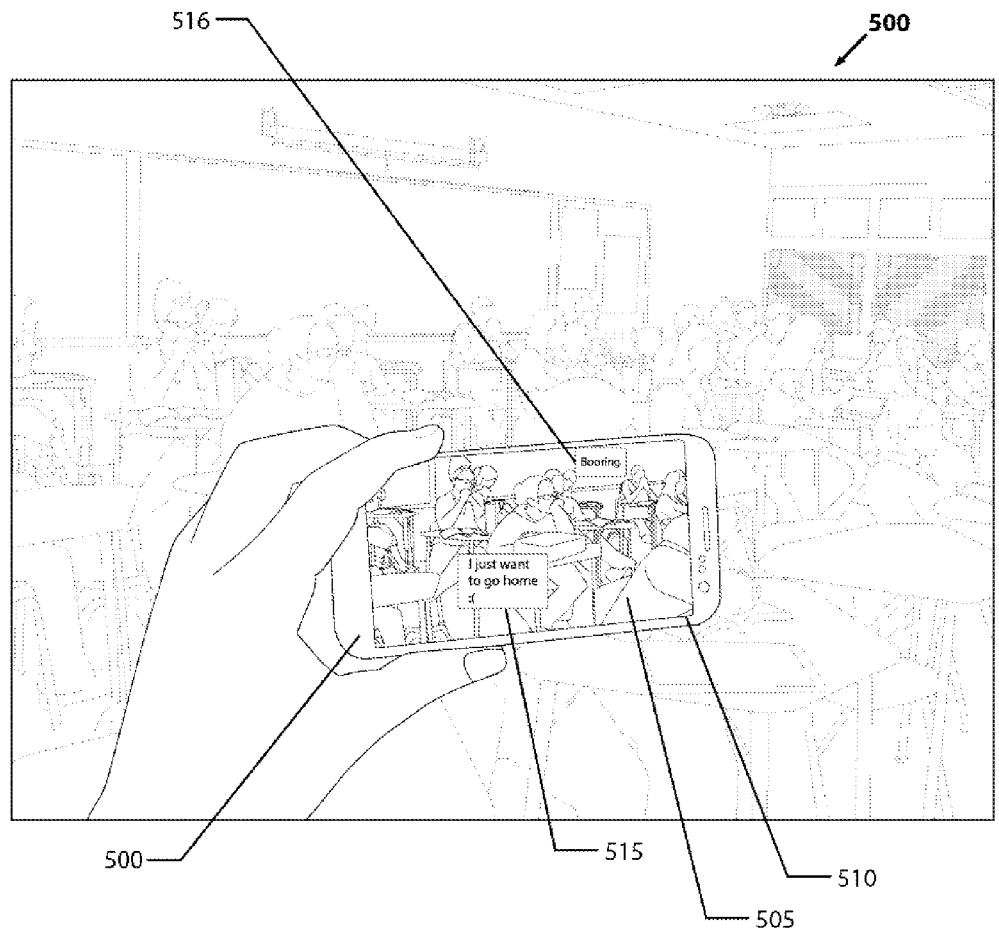
FIG. 5 is an illustration of one embodiment of the mobile computing device and shows how a recipient can decrypt an encrypted digital content by orienting the mobile computing device.

FIG. 5 is an illustration of one embodiment of the mobile computing device and shows how a recipient can decrypt an encrypted digital content by orienting the mobile computing device. As shown in FIG. 5, one embodiment of the mobile computing device 500 may comprise an encrypted application 505 with a display 510. FIG. 5 shows that, upon arriving at the target location, the recipient may utilize the camera of the mobile computing device 500 to create an image or live video feed of the environment using the display 510. Based on the: (1) GPS data of the recipient's mobile computing device 500, as determined by the GPS satellite data feed; (2) orientation of the recipient's mobile computing device 500 as determined by gyroscope component; and (3) device identification information as determined by the IP address and/or MAC address, the digital content 515, 516, which may be one or more messages tied to that target location, may be shown on the display 510 via an image overlay. Preferably, the digital content 515, 516, is superimposed over the environment when displayed with the environment and may only be accessible near the target location of the recipient. In another embodiment, the digital content 515, 516, may also be available only when the recipient views messages through the camera of his or her mobile computing device when positioning the mobile computing device at a certain orientation/angle. Thus, once the mobile computing device 500 has met the requirements for the key such as geolocation data (e.g., GPS coordinates, gyroscope data) and device identification data (e.g., IP address, MAC address), then the digital content may be decrypted.

FIG. 5 shows that, in one embodiment, the camera of the mobile computing device 500 may generate an image of the decrypted digital content, which may be visible on the display, over the environment. The decrypted digital content may include, without limitation, messages, pictures, images, advertisements, directions, or other forms of communication.

Figure 6:
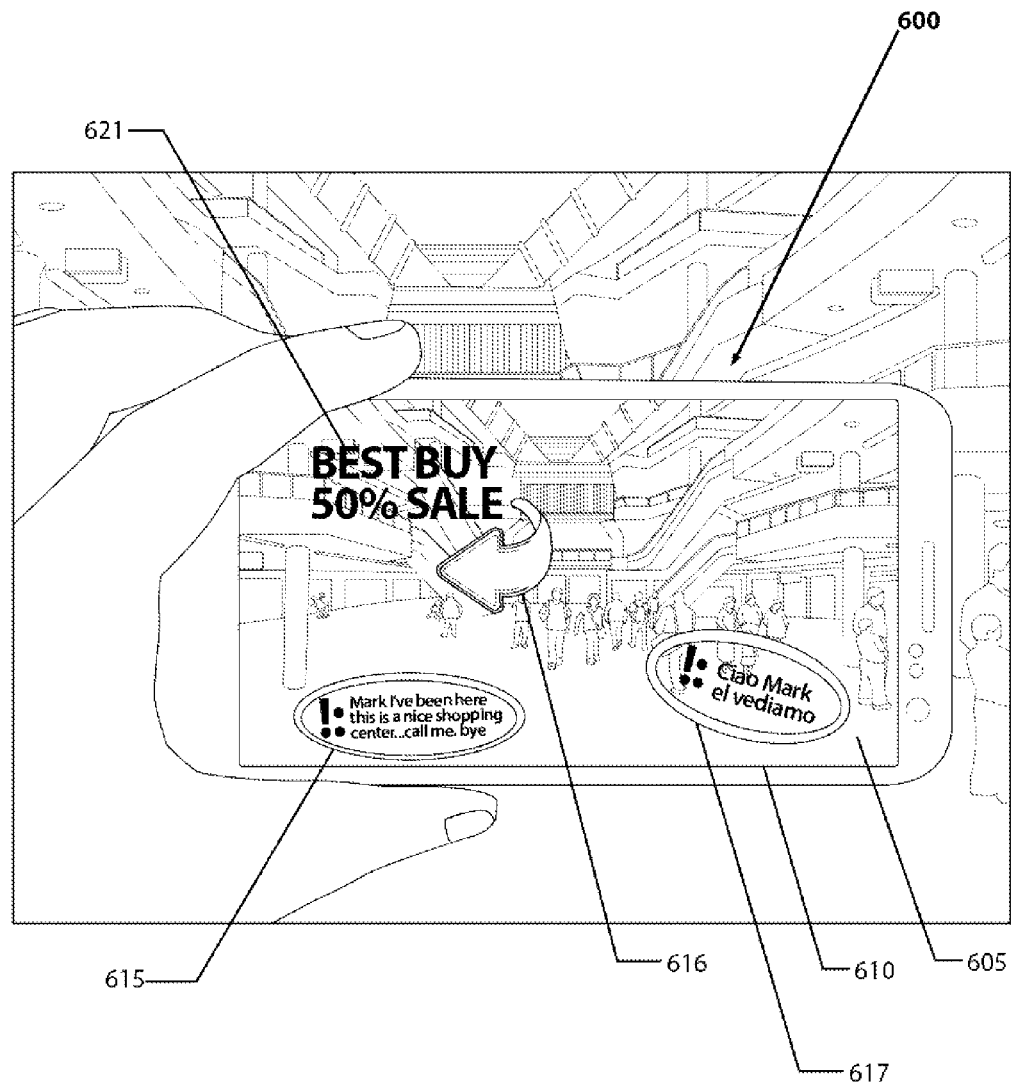
FIG. 6 is an illustration of another embodiment of the mobile computing device and shows how a recipient can decrypt an encrypted digital content by orienting the mobile computing device.

FIG. 6 is an illustration of another embodiment of the mobile computing device and shows how a recipient can decrypt an encrypted digital content by orienting the mobile computing device. As shown in FIG. 6, another embodiment of the mobile computing device 600 may comprise an encrypted application 605 with a display 610. Like the previous embodiment, shown in FIG. 5, another embodiment of the mobile computing device 600 may allow a recipient or user to view the decrypted digital content 615, 616, 617, 621 tied to the target location through his or her mobile computing device 600 when positioning the mobile computing device 600 at a target location (e.g., mall) and at a certain orientation. The decrypted digital content 615, 616, 617, 621 may include messages or advertisements from other users who had visited the target location and desired to leave a location specific message. For example, as shown in FIG. 6, the decrypted digital content 615, 616, 617, 621 may be an advertisement posted by a store located at the target location, wishing to inform recipients of a sale, but only if the recipient is at the desired location. The decrypted digital content 615, 616, 617, 621 may also be visible only when the user is at the target location and has his or her mobile computing device 600 oriented in a particular manner.

Figure 7:
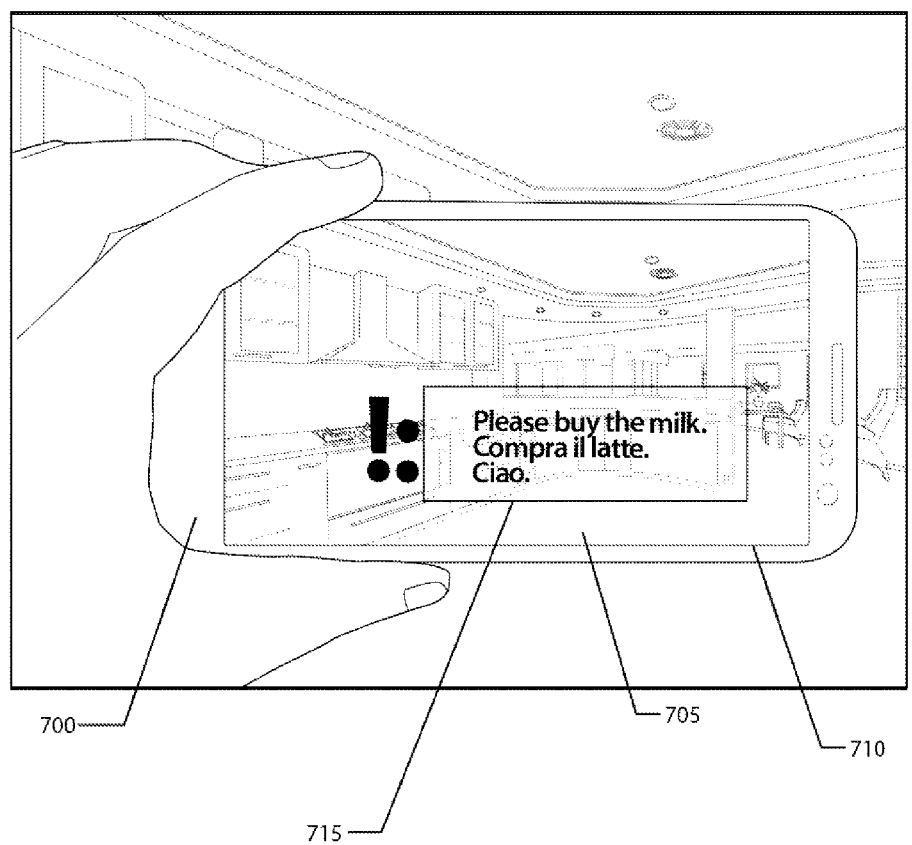
FIG. 7 is an illustration of another embodiment of the mobile computing device and shows how a recipient can decrypt an encrypted digital content by orienting the mobile computing device.

FIG. 7 is an illustration of another embodiment of the mobile computing device and shows how a recipient can decrypt an encrypted digital content by orienting the mobile computing device with a display. As shown in FIG. 7, another embodiment of the mobile computing device 700 may comprise an encrypted application 705 with a display 710. FIG. 7 shows that the decrypted digital content 715 may be a message requesting information from a recipient. For example, in one embodiment, a user may create a message, which becomes encrypted by the geolocation-based encryption method 100 and tied to the target location. The message is preferably not displayed unless the recipient arrives at the target location and orients his or her mobile computing device 700 at a specific angle or orientation. Once the recipient arrives at the target location and orients the mobile computing device 700 at the desired orientation, the encrypted digital content may decrypted and may be accessed by the recipient.

Figure 8:
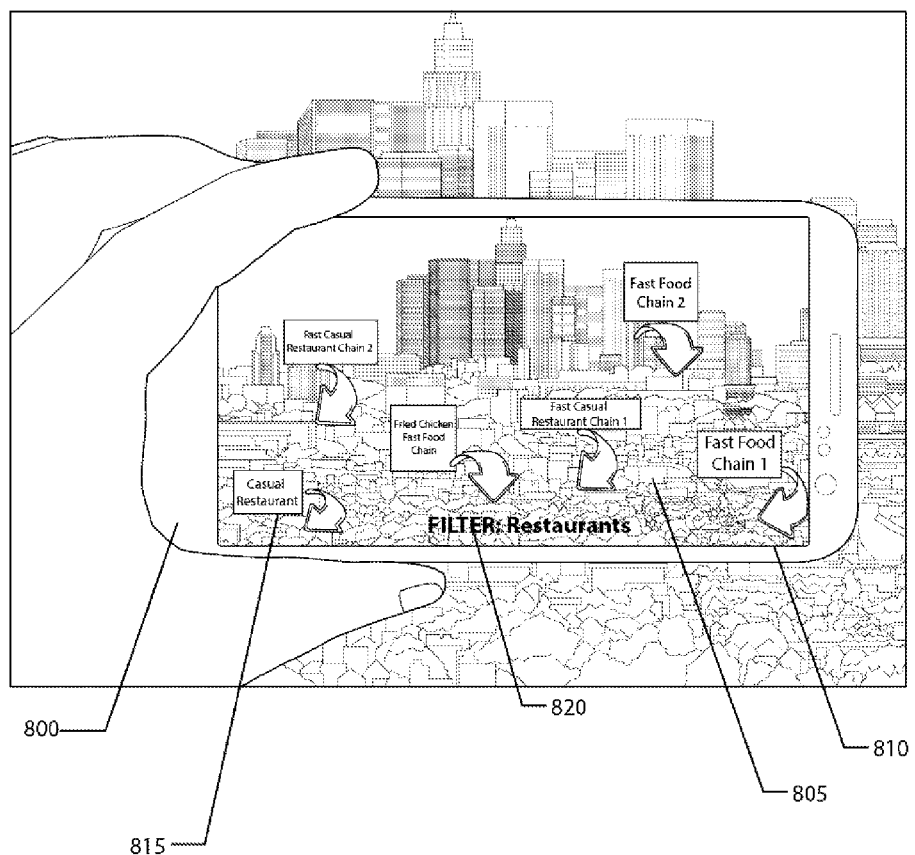
FIG. 8 is an illustration of another embodiment of the mobile computing device and shows how a recipient can decrypt an encrypted digital content by orienting the mobile computing device with a display while using a filter.

FIG. 8 is an illustration of another embodiment of the mobile computing device and shows how a recipient can decrypt an encrypted digital content by orienting the mobile computing device with a display while using a filter. As shown in FIG. 8, another embodiment of the mobile computing device 800 may comprise an encrypted application 805 with a display 810. FIG. 8 shows that, in one embodiment, the user may add digital content to a large environment such as a city scape and tie that digital content to that location. In that environment, the user may then add various encrypted digital content, which may be visible on the display 810 of the mobile computing device 800, depending on the location and orientation of the mobile computing device 800. Because it may be possible that the decrypted digital content 815 may comprises multiple messages, the user may apply a filter 820, which may limit unwanted messages visible to the recipient and display 810. For example, in one embodiment, the filter 820 may only allow restaurant messages to be displayed, thereby only allowing restaurant-related messages to be visible on the display 815. Additionally, because the recipient is at the desired location that substantially matches the decryption key parameters, the decrypted digital content 815 may have an indicator to direct and guide the recipient to the specific location position the mobile computing device 800 at a certain orientation. For example, in the event that the decrypted digital content 815 is not visible, the encryption application 805 may guide the recipient at the desired location to satisfy the geolocation requirements portion for the key. This may be embodied by arrows or directions to guide the user to move and/or position the mobile computing device 800.

Figure 9:
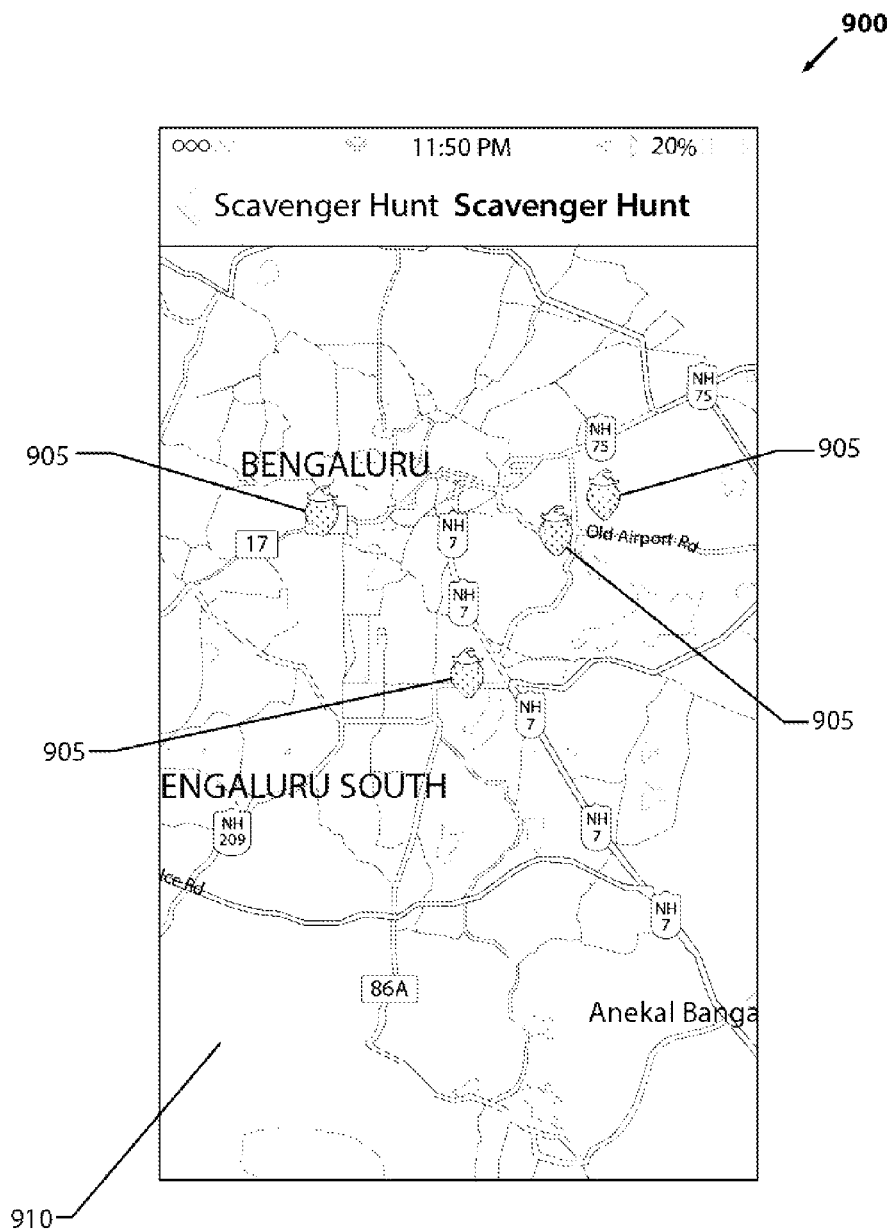
FIG. 9 is a screenshot of one embodiment of the encryption application showing a scavenger hunt.

FIG. 9 is a screenshot of one embodiment of the encryption application showing a scavenger hunt. As shown in FIG. 9, one embodiment of the encryption application 900 may comprise: scavenger hunt locations 905 and a digital map 910. As discussed above, another embodiment of the geolocation-based encryption method may be used to create a scavenger hunt. The scavenger hunt may allow a user to create a series of clues, which are accessible by one or more scavenger hunt participants. Specifically, once the decryption key parameter(s) are met or substantially met, the scavenger hunt participants may find clues to obtain rewards or prizes (e.g., cash prizes). For example, in one embodiment shown in FIG. 9, the digital map 910 may include scavenger locations 905 used for providing clues for rewarding the user or participants with awards and prizes. The scavenger locations 905 may be represented by an image, symbol, or icon such as a strawberry, shown in FIG. 9, or any other images, symbols, icons, or text.

When participating in a scavenger hunt, the user select one or more scavenger locations 905 loaded on the encryption application 900 on his or her mobile computing device. For example, the user may first load a digital map 910, and the digital map 910 may populate the scavenger hunt locations 905 on the digital map 910. After the scavenger hunt locations 905 are populated or shown, the user may select a scavenger hunt location 905 by simply touching or pinning the scavenger hunt location 905 on the digital map. Once the scavenger hunt location(s) 905 are selected, the user may get redirected to a third party's website such as a sponsor or advertiser. In that website, one or more clues of the scavenger hunt may be provided to the user. Based on the clue(s), the user may then utilize the encryption application 900 to search for the possible locations where the reward or prize is located. For example, in one embodiment, the clue may be displayed as an overlay, as described above, or by another way of communicating information to the scavenger hunt participant. The clue may provide the scavenger hunt participant with a hint as to how to meet one or more of the decryption key parameters of the clue in order to view the next clue. Alternatively, scavenger hunt may have a series of clues, with each clue directing the scavenger hunt participant to find a next clue until the scavenger hunt has been completed.

In another embodiment, the scavenger hunt may allow the scavenger hunt participants to decrypt messages that directs them to visit additional scavenger hunt locations 905 in order to obtain additional clues for the scavenger hunt. Specifically, when a scavenger hunt participant decrypts the encrypted content by physically visiting the target location, the decrypted digital content may include additional clues for the next target location.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A geolocation-based encryption method, the steps comprising:
 providing one or more servers;
 providing a first mobile computing device;
 providing an encryption application;
 wherein said encryption application runs on said first mobile computing device and encrypts a digital content stored in a computer readable storage medium;
 wherein said digital content has a unique file identifier;
 wherein said first mobile computing device comprises a display, a camera, a gyroscope, and a global positioning system;
 prompting, by said encryption application, a user of said first mobile computing device to select a target location on said first mobile computing device to create a global positioning system data using said global positioning system;
 selecting via said first mobile computing device said target location creating said global positioning system data;
 prompting, by said encryption application, a user of said first mobile computing device to physically orient said first mobile computing device to a target orientation to create a target gyroscope data using said gyroscope of said first mobile computing device;
 orienting said first mobile computing device to said target orientation creating said target gyroscope data;
 generating by said encryption application on said first mobile computing device a key based on a geolocation data, a device identification data, and said unique file identifier;
 wherein said geolocation data comprises said global positioning system data and said target gyroscope data;

encrypting by said encryption application said digital content based on said key;
establishing one or more secure sessions between said user and said one or more servers; and
transmitting said encrypted digital content to said one or more servers;
wherein said encryption application is configured to run on a second mobile computing device associated with a recipient of said digital content;
wherein said device identification data comprises an internet protocol address of said second mobile computing device;
wherein said encryption application running on said second mobile computing device:
 (1) downloads said encrypted digital content from said one or more servers based on said device identification data and said unique file identifier; and
 (2) decrypts said encrypted digital content based on said key to generate said decrypted digital content;
wherein said second mobile computing device comprises a display, a camera, a gyroscope, and a global positioning system;
wherein said decryption of said encrypted digital content occurs on said second mobile computing device only when said second mobile computing device is physically oriented by said recipient at approximately said target orientation; and
wherein said display of said second mobile computing device displays an environment with an image overlay of said decrypted digital content via said camera of said second mobile computing device.

2. The geolocation-based encryption method of claim 1, wherein said device identification data comprises a machine access control address of said second mobile computing device.

3. The geolocation-based encryption method of claim 1, wherein said decryption of said encrypted digital content occurs only when said second mobile computing device is physically positioned approximately at said target location.

4. The geolocation-based encryption method of claim 1, wherein said decryption of said encrypted digital content occurs on said second mobile computing device only when said recipient selects said target location on a digital map displayed on said display of said second mobile computing device.

5. The geolocation-based encryption method of claim 1, wherein said image overlay is one or more advertisements.

6. The geolocation-based encryption method of claim 1, wherein said image overlay is a clue for a scavenger hunt, said clue being adapted to direct said recipient to a second target location.

7. The geolocation-based encryption method of claim 1, wherein a filter may be applied using said encryption application that limits unwanted messages visible to said recipient on said display of said second mobile computing device.

8. A geolocation-based encryption system, the system comprising:
a first mobile computing device;
wherein said first mobile computing device comprises a display, a camera, a gyroscope, computer readable storage medium, an encryption application, and a global positioning system;
wherein said computer readable storage medium runs said encryption application that comprises one or more instructions that, when executed by said first mobile computing device, cause said first mobile computing device to:
 prompt a user of said first mobile computing device to select a target location on said first mobile computing device to create a global positioning system data using said global positioning system;
 accept a selection of said target location;
 prompt said user of said first mobile computing device to physically orient said first mobile computing device to a target orientation to create a target gyroscope data using said gyroscope of said first mobile computing device;
 accept said target gyroscope data;
 wherein a geolocation data comprises said global positioning system data and said target gyroscope data;
 generate a key
 encrypt a digital content that is stored in said computer readable storage medium based on said key, such that an encrypted digital content is created;
 wherein said key is based on said geolocation data, a device identification data, and a unique file identifier associated with said digital content;
 establish one or more secure sessions among said user, a recipient of said encrypted digital content, and one or more servers; and
 transmit said encrypted digital content to a second mobile computing device associated with said recipient via one or more servers;
wherein said second mobile computing device comprises a display, a camera, a gyroscope, a global positioning system, and said encryption application wherein said encryption application decrypts said encrypted digital content based on said key to generate a decrypted digital content;
wherein said decryption of said encrypted digital content only occurs when said second mobile computing device is physically positioned approximately at said target location
wherein said decryption of said encrypted digital content only occurs when said second mobile computing device is physically oriented at approximately said target orientation;
wherein said display of said second mobile computing device displays an environment with an image overlay of said decrypted digital content via said camera of said second mobile computing device.

9. The geolocation-based encryption system of claim 8, wherein said device identification data comprises an internet protocol address of said second mobile computing device.

10. The geolocation-based encryption system of claim 8, wherein a filter may be applied using said encryption application that limits unwanted messages visible to said recipient on said display of said second mobile computing device.

11. The geolocation-based encryption system of claim 8, wherein said decryption of said encrypted digital content only occurs when said recipient selects said target location on a digital map displayed on said display of said second mobile computing device.

12. A non-transitory computer readable medium, comprising one or more executable instructions, which, when executed by a first mobile computing device, configure the first mobile computing device to perform a geolocation-based encryption of a digital content, the method comprising the steps:

prompting a user of said first mobile computing device to select a target location on said first mobile computing device to create a global positioning system data;

selecting said target location and creating said global positioning system data;

wherein said first mobile computing device comprises a display, a camera, a gyroscope, a global positioning system, and an encryption application;

prompting a user to physically orient said first mobile computing device to create a target orientation to create a target gyroscope data;

orienting said first mobile device to said target orientation creating said target gyroscope data;

generating a key based on a geolocation data, a device identification data, and a unique file identifier associated with said digital content;

wherein said geolocation data comprises said global positioning system data and said target gyroscope data;

encrypting said digital content stored in a computer readable storage medium based on said key;

establishing one or more secure sessions among said user, a recipient of said digital content, and said one or more servers; and transmitting said encrypted digital content to a second mobile computing device via said one or more servers;

wherein said second mobile computing device comprises a display, a camera, a gyroscope, a global positioning system, and an encryption application;

wherein said encryption application running on said second mobile computing device decrypts said encrypted digital content based on said key to generate a decrypted digital content;

wherein said decryption of said encrypted digital content only occurs when said second mobile computing device is physically positioned approximately at said target location;

wherein said decryption of said encrypted digital content only occurs when said recipient selects said targeted location on a digital map displayed on said second mobile computing device;

wherein said decryption of said encrypted digital content only occurs when said second mobile computing device is approximately physically oriented at said target orientation; and wherein said display of said second mobile computing device displays an environment with an image overlay of said decrypted digital content via said camera of said second mobile computing device.

13. The non-transitory computer readable medium of claim 12, wherein said device identification data comprises an internet protocol address of said second mobile computing device.

14. The non-transitory computer readable medium of claim 12, wherein a filter may be applied using said encryption application that limits unwanted messages visible to said recipient on said display of said second mobile computing device.

* * * * *